United States Patent [19]
Koos

[11] Patent Number: 5,252,005
[45] Date of Patent: Oct. 12, 1993

[54] CYLINDER ROD FIRE PROTECTION SYSTEM

[75] Inventor: John D. Koos, The Woodlands, Tex.

[73] Assignee: Paul-Munroe Hydraulics, Inc., Orange, Calif.

[21] Appl. No.: 845,271

[22] Filed: Mar. 3, 1992

[51] Int. Cl.$^5$ .............................................. E02D 5/62
[52] U.S. Cl. ................... 405/224.4; 405/211; 166/364
[58] Field of Search .................. 405/211, 211.1, 216, 405/195.1, 224.4, 223.1; 252/606, 601; 166/364

[56] References Cited

U.S. PATENT DOCUMENTS

| | | | |
|---|---|---|---|
| 4,529,467 | 7/1985 | Ward et al. | 252/606 X |
| 4,743,142 | 5/1988 | Shiraishi et al. | 405/211 X |
| 4,883,387 | 11/1989 | Myers et al. | 405/224.4 |
| 5,035,951 | 7/1991 | Dimanshteyn | 252/606 X |
| 5,053,077 | 10/1991 | Crompton | 252/606 X |
| 5,058,342 | 10/1991 | Crompton | 252/601 X |
| 5,094,780 | 3/1992 | von Bonin | 252/606 |
| 5,169,265 | 12/1992 | Butler et al. | 405/224.4 |

Primary Examiner—Randolph A. Reese
Assistant Examiner—J. Russell McBee
Attorney, Agent, or Firm—Joseph R. Dwyer

[57] ABSTRACT

Fire protection for the tensioner cylinders of a marine riser tensioner system in oil and gas offshore drilling and production rigs where the tensioner cylinders are coated with intumescent epoxy and their respective cylinder rods are enclosed within outer fire protection cylinders which comprise an inner metal lining and an outer jacket. The outer jacket comprises an inner multi-layer thick blanket of ceramic fibrous materials and barrier films contained within inner and outer layers of woven ceramic fibers for reinforcement and abrasion resistance. The outer fire protection cylinders telescope over the tensioner cylinders as the cylinder rods extend and retract in response to vertical movement of the rigs. The intumescent epoxy on the tensioner cylinders are covered with a bearing sleeve to provide a smooth surface for the telescoping fire protecting cylinders and fire retardant mechanisms are located at the tops and bottoms of the telescoping cylinders to prevent intrusion of heat and flame.

9 Claims, 3 Drawing Sheets

CYLINDER ROD FIRE PROTECTION SYSTEM

BACKGROUND OF THE INVENTION

1. Field of Invention

Fire protection of tensioner systems for marine risers in oil and gas offshore drilling and production rigs.

2. Related Applications

U.S. application Ser. No. 07/695,296 filed May 3, 1991 by John D. Koos and Alan E. Ester entitled "Passive Fire Protection System for Articulating Joints and Flexible Connections" and U.S. application Ser. No. 07/767,025 filed Sep. 27, 1991 by Bryan V. Butler and John D. Koos entitled "Passive Fire Protection System for Marine Risers".

The Koos & Ester application disclosed and claimed a fire protection system for articulating joints and flexible connections of a marine riser system.

In this system, the articulating joints, flexible connections and tensioner ring are fire and flame protected, respectively, by covers or jackets comprising an inner multi-layer composite blanket of ceramic fibrous materials and barrier films contained within inner and outer layers of woven ceramic fibers for reinforcement and abrasion resistance and the other exposed uncovered parts of the system were provided with a coating of intumescent epoxy for fire and flame protection. Also disclosed were accordian pleated jackets to protect the cylinder rods of the pneumatic-hydraulic tensioner cylinders while the tensioner cylinders themselves were protected with a coating of intumescent epoxy. The accordian pleating of the jackets accomodated the expansion and retraction of the cylinder rods due to wave motion on the offshore oil and gas rigs.

The Butler and Koos application disclosed and claimed a fire protection for adjustable top joints and other risers with standardized prefabricated jackets which comprise an inner multi-layer composite blanket of ceramic fibrous material and barrier film contained within inner and outer layers of woven ceramic fibers for reinforcement and abrasion resistance. These jackets were essentially equal in length and nested within adjacently positioned jackets. The number of jackets to be used depended upon the length of the item being protected.

The purpose of this invention is to provide fire protection of the cylinder rods of the pneumatic-hydraulic tensioner cylinders in a marine riser tensioner system of an offshore oil and gas rig.

More specifically, it is the purpose of this invention to provide an improved alternative to the pleated jackets of the Koos and Ester application for the protection of the cylinder rod of the pneumatic-hydraulic tensioner cylinders in a marine riser tensioner system of an offshore oil and gas rig.

SUMMARY OF THE INVENTION

In this invention the tensioner cylinders of the marine riser tensioner system are provided with a coating of intumescent epoxy and their respective cylinder rods are enclosed within an outer fire protection cylinder which comprises an inner metal lining and an outer jacket. The outer jacket comprises an inner multi-layer thick blanket of ceramic fibrous materials and barrier films contained within inner and outer layers of woven ceramic fibers for reinforcement and abrasion resistance. The outer fire protection cylinder telescopes over the tensioner cylinder as the cylinder rod extends and retracts in response to movement of the oil or gas rig and a bearing sleeve is placed over the intumescent epoxy on the tensioner cylinders to facilitate operation of the telescoping fire protective cylinder. Fire retardant mechanisms located at the top and bottom of the telescoping fire protective cylinder prevent the intrusion of heat or flame.

DETAILED DESCRIPTION

Figure 1:
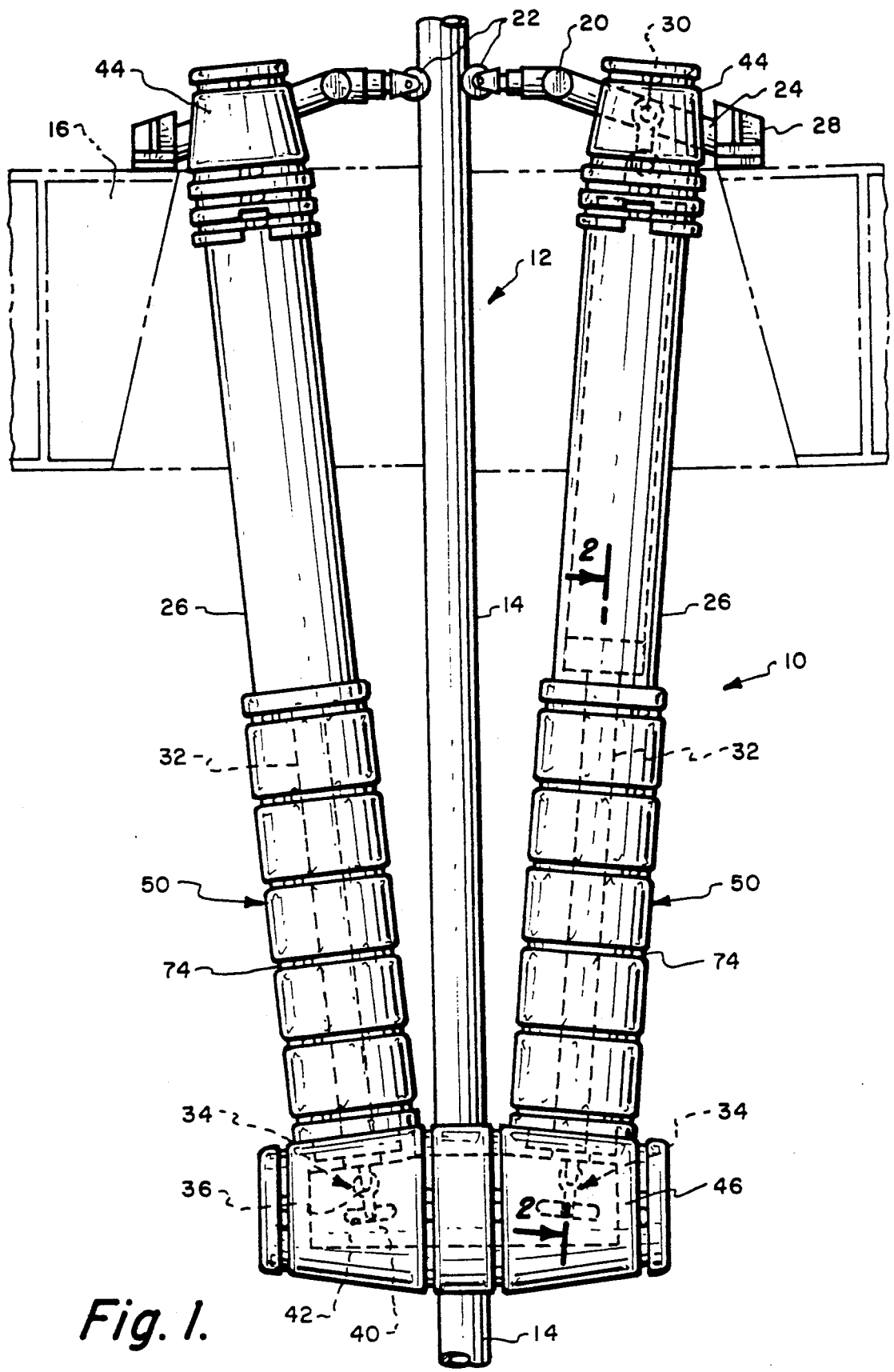
FIG. 1 is an elevational view of a marine riser tensioner system of an offshore rig illustrating the fire protection of the cylinder rods and tensioner cylinders in accordance with this invention. This figure also shows the protection of the articulated joints and spider ring against fire as disclosed in the Koos and Ester application.

FIG. 1 illustrates a marine riser tensioner system 10 of the pneumatic-hydraulic type which extends through a hole 12 in a platform of an offshore rig to permit relative motion between a riser string 14 and the platform. As shown, riser section 14 is one of a string of riser sections which extend from the platform to a well on the ocean floor.

The riser tensioner system 10 is secured to a suitable support, such as I-beams 16, and a supporting ring 20 which encircles the riser section 14. Rollers 22 guide and center the riser 14. The supporting ring 20 is spaced above and secured to the I-beams 16 by short structural members 24 and 28 to provide sufficient clearance for pneumatic-hydraulic tensioner cylinders 26 (only two shown in FIG. 1). These tensioner cylinders 26 are connected to the structural members 24 by articulating joints 30, formed by suitable pins, eye bolts and clevises. Typically, the tensioner cylinders 26 are connected to the I-beams 16 and extend downwardly where the cylinder rods 32 are connected to the riser 14 by articulating joints 34 typically formed by clevises 36 and holes or slots 40 formed in a spider ring 42 secured to the riser 14. Thus, during relative movement between the riser string and the platform, as a under tension as a function of the pneumatic-hydraulic cylinders 26.

Thus far described, the riser tensioner system 10 is conventional and shown in any number of patents and articles about offshore sub-sea drilling and production rigs and need not be described further.

As also described in the related applications, the riser tensioner system 10 is protected by a coating of intumescent epoxy on the tensioner cylinders 26 and other rigid members, such as the supporting ring 20, and on the structural members 24 and 28. Multi-layer flexible covers comprising multi-layer composite blanket of ceramic fibrous materials and barrier films contained within inner and outer layers of woven ceramic fibers are placed over the articulating joints, such as 30 and 34. These covers are in the form of end caps 44 and a spider cover 46 as more fully disclosed in the first related application which is incorporated herein by reference.

Figure 4:
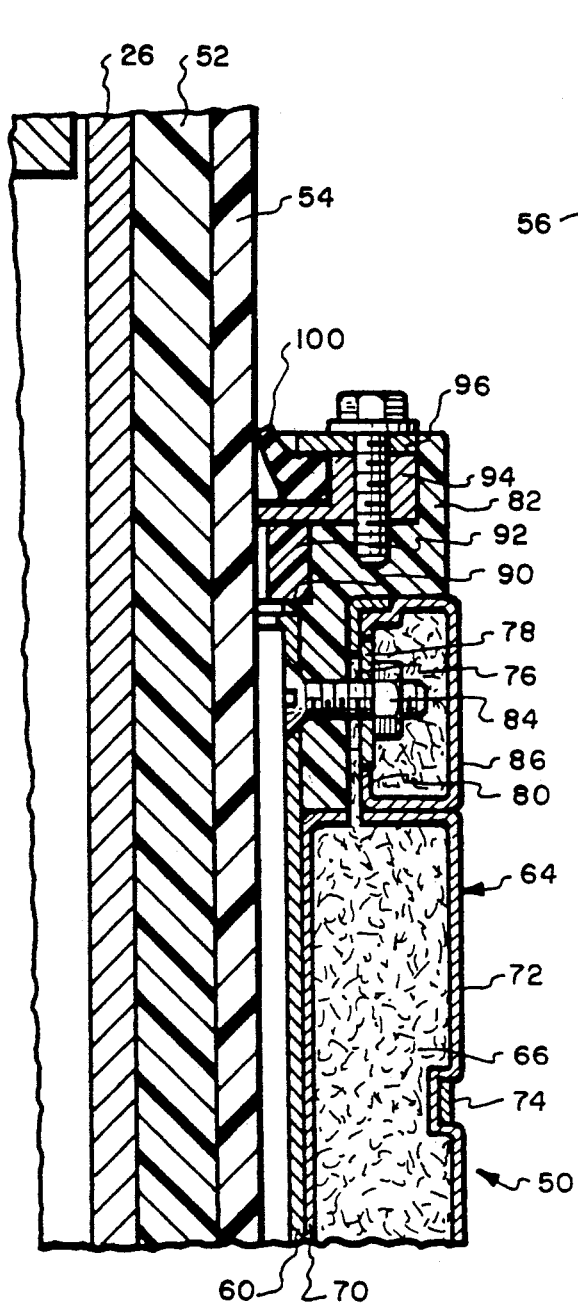
FIG. 4 is an enlargement of the area encircled at 4 in FIG. 3, in cross-section, of the top part of the fire protection cylinder and part of the tensioner cylinder.

As mentioned above, this invention provides improved fire protection of the cylinder rods 32 and this is accomplished by the provision of a fire protection cylinder, indicated in its entirety as 50, which extends from the tensioner cylinder 26 to the clevis 36. As shown in FIG. 4, the top of the fire protection cover 50 overlaps the tensioner cylinder 26, in its fully expanded position, and are joined to the spider cover in a manner to prevent the intrusion of heat or flame as by overlapping or nesting, at its lower end, within the spider cover 46.

Figure 5:
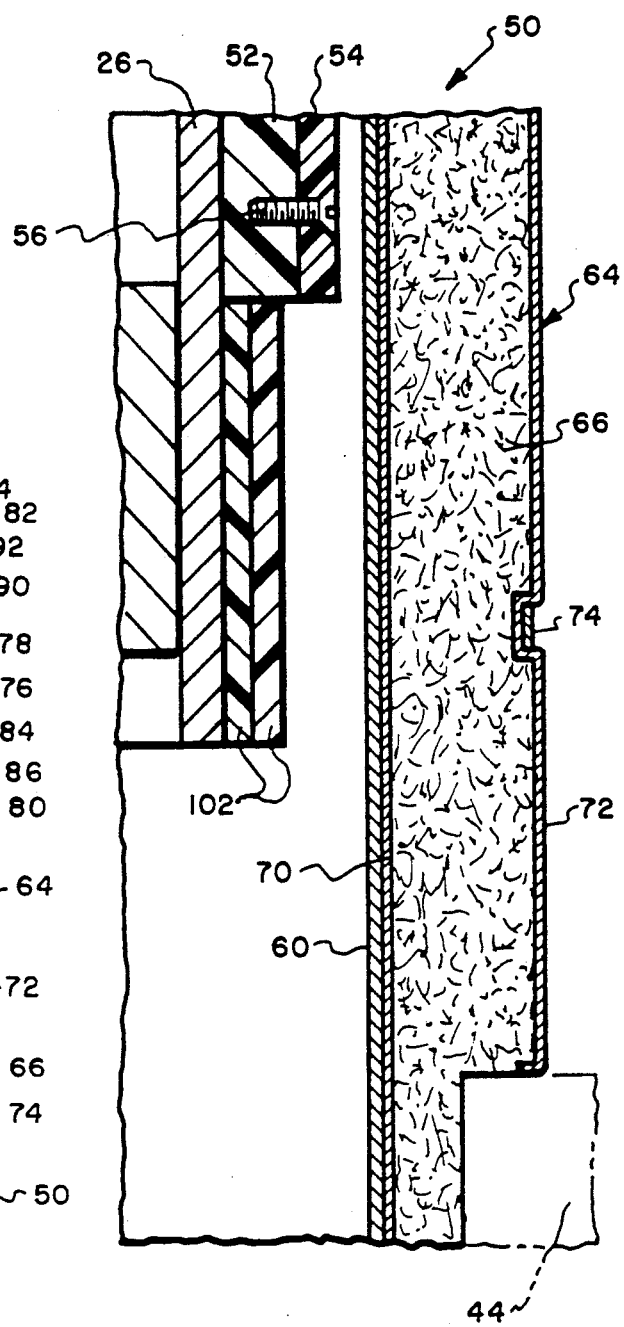
FIG. 5 is an enlargement of the area encircled at 5 in FIG. 3, in cross-section, of the lower part of the tensioner cylinder and part of the fire protection cylinder.

For fire protection of the tensioner cylinder 26, the tensioner cylinder 26 is coated with an intumescent epoxy 52 over its entire length and a bearing sleeve or tube 54 shown as plastic is inserted over the epoxy and suitably fastened thereto as by screws 56 (shown in FIG. 5). Tube 54 provides a smooth surface for the telescoping fire protective cylinder and may be metal in lieu of plastic, if desired.

Figure 2:
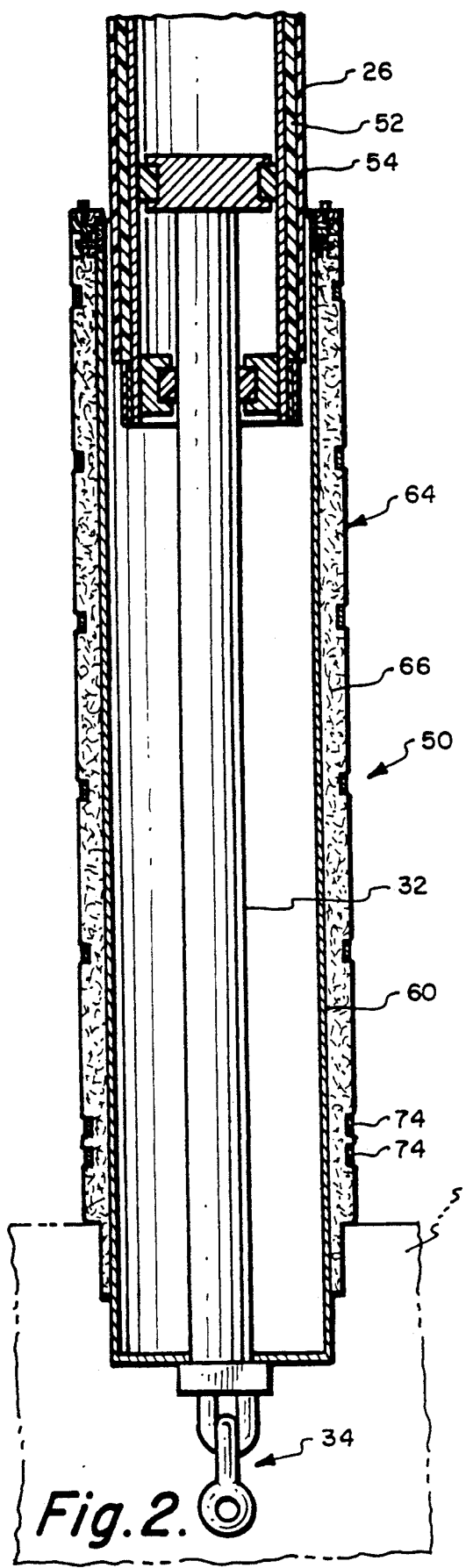
FIG. 2 is an elevational view partly in cross-section taken along the line 2—2 of FIG. 1 showing the tensioner rod and its telescoping fire protection cylinder in an extended position.
Figure 3:
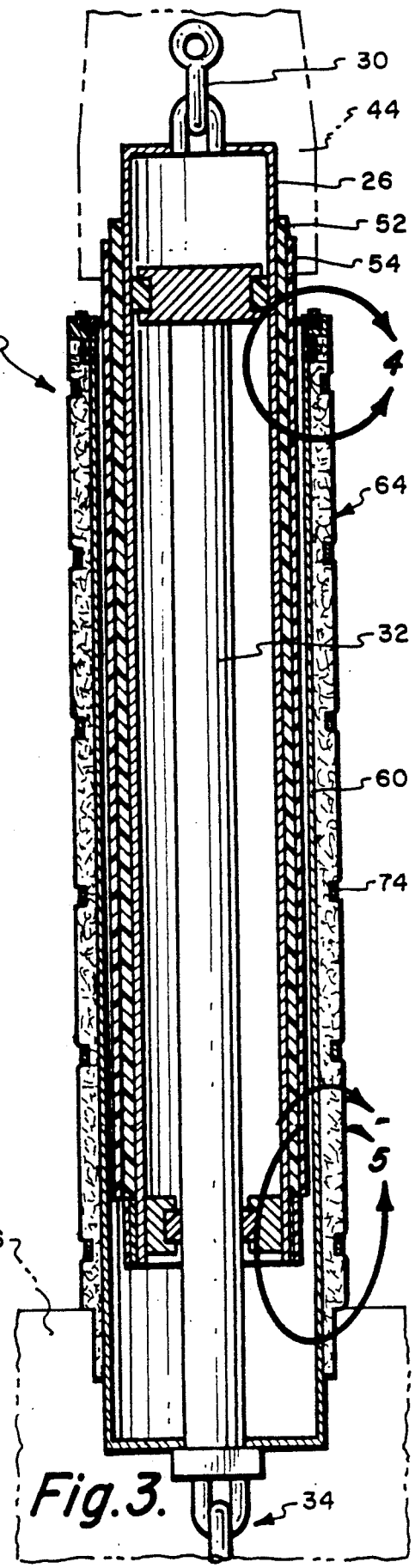
FIG. 3 is a view similar to FIG. 2 showing the cylinder rod telescoping fire protection cylinder in a retracted position.

This outer fire protection cylinder 50 comprises an inner metallic fire can or support tube 60 having an inner diameter sufficient to allow the tensioner cylinder 26 and its coating 52 and tube 54 to be telescoped within as clearly shown in FIGS. 2 and 3 and terminates in an apertured horizontal wall 62 at or near the clevis 34 to seal the cylinder rod 32.

This support tube 60 supports an outer jacket 64, as more clearly shown in FIGS. 4 and 5, which comprises an inner blanket of multi-layer composite blanket 66 of ceramic fibrous material and barrier films contained within inner and outer layers of woven ceramic fibers 70 and 72 for weather protection, reinforcement and abrasion resistance. Suitable strapping 74 also of ceramic fibers may be disposed along the length of the jacket 64 where necessary for binding the jacket 64 to the support tube 60. The jacket 64 is of the same material as the covers over the articulating joints and spider. The thickness of the jacket 64 and the other covers is dependent upon the fire duration and the allowable temperature of the item being protected at the end of this duration. Also, while only a single jacket 64 is shown, the jacket may comprise a plurality of shorter jackets extending the length of the fire can 60 and suitably joined as by nesting or otherwise connected to prevent fire and heat intrusion.

The upper end 76 of the jacket 64 is clamped between a plurality of washers 78 and a downwardly extending flange 80 of a ring type bearing carrier 82 by a plurality of suitable bolts and nuts 84. Although only one is shown, these washers 78 and nut and bolts 84 are located about the upper end of the jacket 64 and cooperate with eyelets (not shown) to not only clamp the upper end 76 of the jacket but also serve as hangers for the jacket during assembly of the outer protective cover 50. After assembly, the upper end 76 is covered with a protective cover 86 of the same material as the jacket 64 to prevent the intrusion of heat onto the washers 78 and nuts and bolts 84. Bearing carrier 82 has a bearing seat 90 for a bearing 92 of material such as teflon which is clamped into seat 90 by a clamping ring 94. This clamping ring 94 is held in place by a second metallic ring 96 which also functions to clamp a plastic wiper seal 100 which engages the bearing tube 54 to prevent entry of mud and debris between the bearing tube 54 and the fire can 60.

At the lower end of the tensioner cylinder 26, as shown in FIG. 5, it can be seen that the plastic tube 54 ends at the intumescent epoxy 52 and two layers of plastic rings 102 (two shown) form an extension of the epoxy 52 and form a fire stop. These plastic rings expand in response to heat to engage the ring 54 and fire can 60 thereby sealing the lower end of the tensioner cylinder within the fire protection cylinder 50. These plastic rings are a 3M product sold under the trademark "Fire Stop" or equivalents.

I claim:

1. A passive fire protection means for protecting the cylinder rod of a pneumatic-hydraulic cylinder having intumescent epoxy coating on the cylinder comprising,
   a bearing tube over said intumescent epoxy coating,
   an outer fire protection cylinder over said cylinder rod and telescoping over said cylinder and its coating and tube including,
   an inner metallic cylindrical fire can which extends the length of said cylinder rod, and
   an outer jacket of flexible protective cover means over
   said fire can.

2. The fire protection means as claimed in claim 1 wherein said outer jacket comprises an inner multi-layer blanket of ceramic fibrous materials and barrier films contained within inner and outer layers of woven ceramic fibers for reinforcement and abrasion resistance.

3. The fire protection means as claimed in claim 2 further including means at the lower end of said cylinder which expands in response to heat to engage said fire can and cylinder to form a fire stop.

4. The fire protection means as claimed in claim 3 further including wiper seal means and a bearing at the upper end of said outer fire protection cylinder.

5. In a riser tensioner system including a plurality of pneumatic-hydraulic cylinders and cylinder rods which extend from an offshore rig to a riser to maintain the riser in tension during vertical movement of the rig and which are connected to said riser and said rig by a plurality of articulating joints, the improvement in such system comprising,
   fire protection cylinders over said cylinder rods to protect the cylinder rods against heat and flame which includes,
   metallic cylindrical support cans extending the length of said rod and telescoping over said cylinders,
   protective covers in the form of tubes covering said support cans,
   said protective covers each comprising a thick interior blanket of ceramic fibrous material and barrier films and contained within inner and outer layers of woven ceramic material for reinforcement and abrasion resistance.

6. The system as claimed in claim 5 further including material which expand when heated located at the lower end of said cylinders to engage said support cans and seal the cylinder rods against heat and flame.

7. The system as claimed in claim 6 wherein said articulated joints are flame protected by a flexible cover means and wherein said protective covers are joined with said flexible cover means to prevent fire and heat intrusion.

8. A method of providing fire protection of the cylinder rod of a pneumatic-hydraulic cylinder comprising the steps of, coating said cylinder with intumescent epoxy,
fitting a bearing tube over said intumescent epoxy,
providing a fire can of metallic material over said cylinder rods and telescoping over said epoxy and tube,
providing a jacket over said fire can comprising a thick interior blanket of ceramic fibrous materials and barrier films contained within woven ceramic cover means for heat and abrasion resistance.

9. The method as claimed in claim 8 further including the provision of a fire stop means between said cylinder and said fire can to prevent the intrusion of heat and flame.

* * * * *